(12) United States Patent
Zones et al.

(10) Patent No.: US 10,384,951 B1
(45) Date of Patent: Aug. 20, 2019

(54) MOLECULAR SIEVE SSZ-113, ITS SYNTHESIS AND USE

(71) Applicant: Chevron U.S.A. Inc., San Ramon, CA (US)

(72) Inventors: Stacey Ian Zones, San Francisco, CA (US); Dan Xie, Richmond, CA (US); Cong-Yan Chen, Kensington, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 16/194,453

(22) Filed: Nov. 19, 2018

Related U.S. Application Data

(60) Provisional application No. 62/632,694, filed on Feb. 20, 2018.

(51) Int. Cl.
| | | |
|---|---|---|
| *C01B 39/48* | (2006.01) |
| *B01J 29/70* | (2006.01) |
| *B01J 29/04* | (2006.01) |
| *C01B 39/06* | (2006.01) |

(52) U.S. Cl.
CPC ............. *C01B 39/48* (2013.01); *B01J 29/047* (2013.01); *B01J 29/70* (2013.01); *C01B 39/06* (2013.01); *B01J 2229/34* (2013.01); *C01P 2002/30* (2013.01); *C01P 2002/72* (2013.01); *C01P 2004/03* (2013.01)

(58) Field of Classification Search
CPC ..... C01B 39/06; C01B 39/46; C01P 2002/74; B01L 29/047; B01L 29/70
See application file for complete search history.

(56) References Cited

U.S. PATENT DOCUMENTS

| 4,483,835 A | * | 11/1984 | Zones ................. C01B 33/2876 |
| | | | 423/326 |
| 2011/0011810 A1 | | 1/2011 | Lorgouilloux et al. |
| 2012/0041210 A1 | | 2/2012 | Dodin et al. |
| 2015/0202603 A1 | | 7/2015 | Schmidt et al. |
| 2018/0207625 A1 | * | 7/2018 | Davis ..................... B01J 35/002 |

OTHER PUBLICATIONS

S.I. Zones and A.W. Burton "Diquaternary structure-directing agents built upon charged imidazolium ring centers and their use in the synthesis of one-dimensional pore zeolites" J. Mater. Chem. 2005, 15, 4215-4223.
P. Lu, L. Gomez-Hortiguela, L. Xu and M.A. Camblor "Synthesis of STW zeolites using imidazolium-based lications of varying length" J. Mater. Chem. A 2018, 6, 1485-1495.
PCT International Search Report, International Appl. No. PCT/IB2018/059086, dated Feb. 12, 2019.
P. Lu, L. Gomez-Hortiguela, L. Xu and M.A. Camblor "Synthesis of STW zeolites using imidazolium-based dications of varying length" J. Mater. Chem. A, 2018, 6, 1485-1495.

* cited by examiner

*Primary Examiner* — David M Brunsman
(74) *Attorney, Agent, or Firm* — Terrence M. Flaherty

(57) ABSTRACT

A novel synthetic crystalline molecular sieve material, designated SSZ-113, can be synthesized using 1,3-bis(2,3-dimethyl-1H-imidazolium)propane dications as a structure directing agent. SSZ-113 may be used in organic compound conversion and/or sorptive processes.

12 Claims, 3 Drawing Sheets

MOLECULAR SIEVE SSZ-113, ITS SYNTHESIS AND USE

CROSS-REFERENCE TO RELATED APPLICATIONS

This application claims priority to and the benefit of U.S. Provisional Application Ser. No. 62/632,694, filed Feb. 20, 2018.

FIELD

This disclosure relates to a novel synthetic crystalline molecular sieve, designated SSZ-113, its synthesis, and its use in sorption and catalytic processes.

BACKGROUND

Zeolitic materials are known to have utility as sorbents and to have catalytic properties for various types of organic compound conversion reactions. Certain zeolitic materials are ordered, porous crystalline materials having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for sorption molecules of certain dimensions while rejecting those of larger dimensions, these materials have come to be known as "molecular sieves" and are utilized in a variety of ways to take advantage of these properties.

There are currently over 200 known zeolitic framework structures recognized by the International Zeolite Association. There exists a need for new structures, having different properties than those of known materials, for improving the performance of many organic compound conversion and sorption processes. Each structure has unique pore, channel and cage dimensions, which gives its particular properties as described above.

According to the present disclosure, a new molecular sieve structure, designated SSZ-113, has now been synthesized using 1,3-bis(2,3-dimethyl-1H-imidazolium)propane dications as a structure directing agent.

SUMMARY

In one aspect, there is provided a molecular sieve having, in its as-synthesized form, an X-ray diffraction pattern including the peaks listed in Table 1.

In its as-synthesized and anhydrous form, the molecular sieve can have a chemical composition comprising the following molar relationship:

|  | Broad | Exemplary |
| --- | --- | --- |
| $(SiO_2 + GeO_2)/Al_2O_3$ | ≥20 | 20 to 600 |
| $Q/(SiO_2 + GeO_2)$ | >0 to 0.1 | >0 to 0.1 |
| $F/(SiO_2 + GeO_2)$ | >0 to 0.1 | >0 to 0.1 | wherein Q comprises 1,3-bis(2,3-dimethyl-1H-imidazolium)propane dications.

In another aspect, there is provided a molecular sieve having, in its calcined form, an X-ray diffraction pattern including the peaks listed in Table 2.

In its calcined form, the molecular sieve can have a chemical composition comprising the following molar relationship:

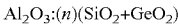

$Al_2O_3:(n)(SiO_2+GeO_2)$ wherein n is at least 20.

In a further aspect, there is provided a method of synthesizing the molecular sieve described herein, the method comprising (a) providing a reaction mixture comprising: (1) a source of germanium oxide; (2) a source of silicon oxide; (3) a source of aluminum oxide; (4) a source of 1,3-bis(2,3-dimethyl-1H-imidazolium)propane dications; (5) a source of fluoride ions; and (6) water; and (b) subjecting the reaction mixture to crystallization conditions sufficient to form crystals of the molecular sieve.

In yet a further aspect, there is provided a process of converting a feedstock comprising an organic compound to a conversion product which comprises contacting the feedstock at organic compound conversion conditions with a catalyst comprising an active form of the molecular sieve described herein.

DETAILED DESCRIPTION

Introduction

Figure 1:
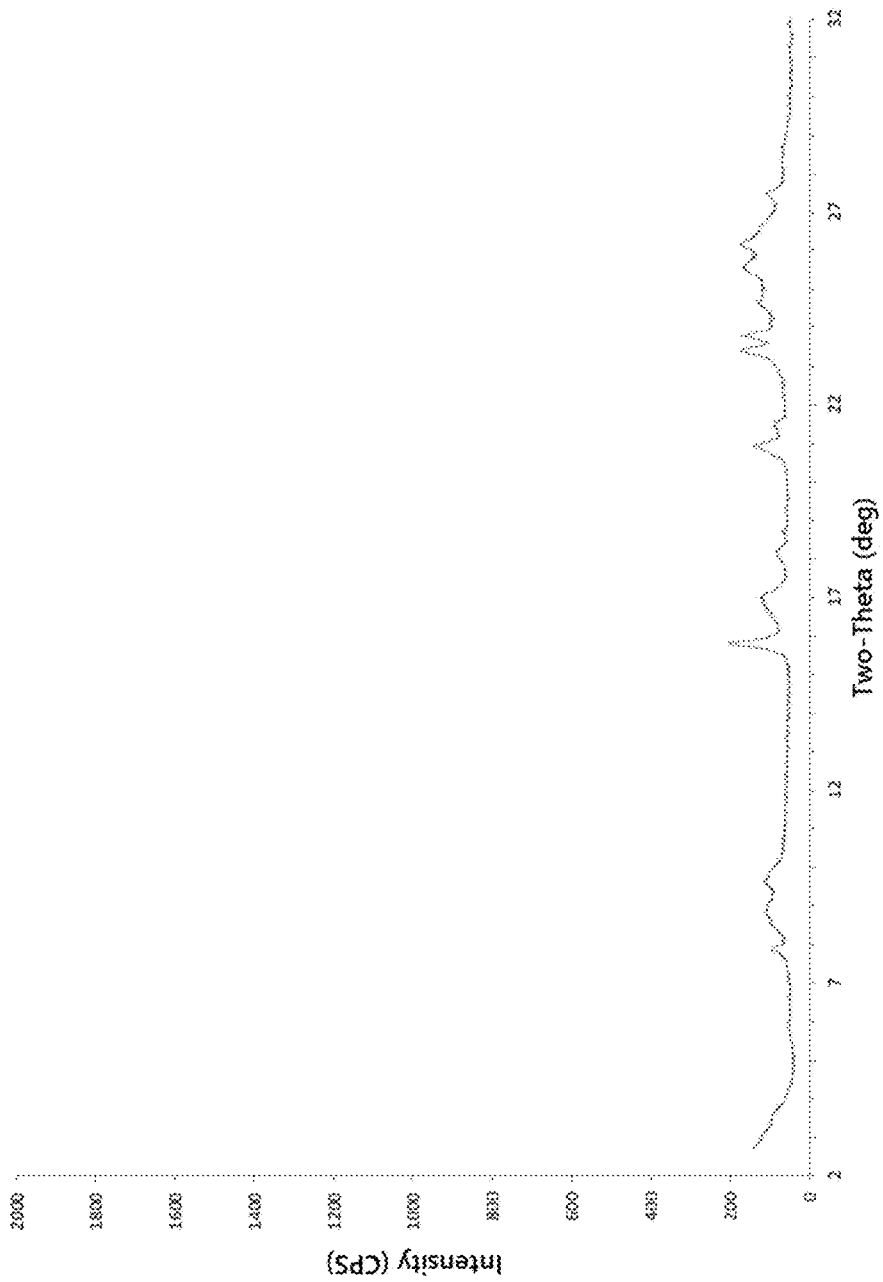
FIG. 1 shows the powder X-ray diffraction (XRD) pattern of the as-synthesized molecular sieve of Example 1.

The term "aluminogermanosilicate" refers to a crystalline microporous solid including aluminum, germanium and silicon oxides within its framework. In some cases, one or more of these oxides may be substituted with other oxides.

The term "as-synthesized" is employed herein to refer to a molecular sieve in its form after crystallization, prior to removal of the organic structure directing agent.

The term "anhydrous" is employed herein to refer to a molecular sieve substantially devoid of both physically adsorbed and chemically adsorbed water.

As used herein, the numbering scheme for the Periodic Table Groups is as disclosed in Chem. Eng. News 1985, 63(5), 26-27.

"Constraint Index" (CI) is a convenient measure of the extent to which a molecular sieve provides controlled access to molecules of varying sizes to its internal structure. Constraint Index is determined herein according the method described by S. I. Zones et al. (*Micropor. Mesopor. Mater.* 2000, 35-36, 31-46). The test is designed to allow discrimination between pore systems composed of 8, 10 and 12 membered ring (MR, the number of tetrahedral or oxygen atoms that make up the ring) pores. The CI value decreases with the increasing pore size of molecular sieves. For example, zeolites are often classified based on the CI values as follows: CI<1 for large pore (12-MR) or extra-large pore (14-MR) zeolites; 1≤CI≤12 for medium pore (10-MR) zeolites; CI>12 for small pore (8-MR) zeolites. A large pore zeolite generally has a pore size of at least 7 Å. An intermediate pore size zeolite generally has a pore size from about 5 Å to less than 7 Å. A small pore size zeolite has a pore size from about 3 Å to less than 5 Å.

Reaction Mixture

In general, molecular sieve SSZ-113 may be synthesized by: (a) providing a reaction mixture comprising (1) a source of germanium oxide; (2) a source of silicon oxide; (3) a source of aluminum oxide; (4) a source of 1,3-bis(2,3-dimethyl-1H-imidazolium)propane dications (Q); (5) a source of fluoride ions; and (6) water; and (b) subjecting the reaction mixture to crystallization conditions sufficient to form crystals of the molecular sieve.

The reaction mixture can have a composition, in terms of molar ratios, within the following ranges:

| Reactants | Broad | Exemplary |
|---|---|---|
| $(SiO_2 + GeO_2)/Al_2O_3$ | 20 | 20 to 600 |
| $Q/(SiO_2 + GeO_2)$ | 0.05 to 0.50 | 0.05 to 0.50 |
| $F/(SiO_2 + GeO_2)$ | 0.10 to 1.00 | 0.15 to 0.50 |
| $H_2O/(SiO_2 + GeO_2 + Al_2O_3)$ | 3 to 8 | 4 to 6 |

Suitable sources of germanium oxide include germanium oxide, germanium alkoxides (e.g., germanium ethoxide), germanium hydroxides, and germanium carboxylates.

Suitable sources of silicon oxide include colloidal silica, fumed silica, precipitated silica, alkali metal silicates and tetraalkyl orthosilicates.

The molar ratio of Si:Ge may be at least 1:1 (e.g., in a range of 2:1 to 500:1 or even in a range of 5:1 to 100:1).

Suitable sources of aluminum oxide include hydrated alumina and water-soluble aluminum salts (e.g., aluminum nitrate).

Combined sources of silicon oxide and aluminum oxide can additionally or alternatively be used and can include aluminosilicate zeolites (e.g., zeolite Y) and clays or treated clays (e.g., metakaolin).

Conveniently, Q comprises 1,3-bis(2,3-dimethyl-1H-imidazolium)propane dications, represented by the following structure (1):

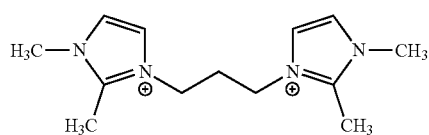

(1)

The above diquaternary ammonium compound can be readily synthesized by a reaction of a 1,3-dihalopropane (e.g., 1,3-dibromopropane or 1,3-diiodopropane) with 1,2-dimethylimidazole by methods known in the art (see, e.g., S. I. Zones et al., *J. Mater. Chem.* 2005, 15, 4215-4223).

Suitable sources of Q are the hydroxides and/or other salts of the diquaternary ammonium compound.

Suitable sources of fluoride ions include hydrogen fluoride, ammonium fluoride and ammonium hydrogen difluoride.

The reaction mixture may contain seeds of a molecular sieve material, such as SSZ-113 from a previous synthesis, in an amount of from 0.01 to 10,000 ppm by weight (e.g., 100 to 5000 ppm by weight) of the reaction mixture. Seeding can be advantageous in decreasing the amount of time necessary for complete crystallization to occur. In addition, seeding can lead to an increased purity of the product obtained by promoting the nucleation and/or formation of SSZ-113 over any undesired phases.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

Crystallization of the molecular sieve from the above reaction mixture can be carried out under either static, tumbled or stirred conditions in a suitable reactor vessel, such as polypropylene jars or Teflon-lined or stainless-steel autoclaves, at a temperature of from 125° C. to 200° C. for a time sufficient for crystallization to occur at the temperature used, e.g., from 2 to 20 days. Crystallization is usually carried out in a closed system under autogenous pressure.

Once the molecular sieve crystals have formed, the solid product is recovered from the reaction mixture by standard mechanical separation techniques such as centrifugation or filtration. The crystals are water-washed and then dried to obtain the as-synthesized molecular sieve crystals. The drying step is typically performed at a temperature of less than 200° C.

As a result of the crystallization process, the recovered crystalline molecular sieve product contains within its pore structure at least a portion of the organic structure directing agent used in the synthesis.

To the extent desired, any cations in the as-synthesized molecular sieve can be replaced in accordance with techniques well known in the art by ion exchange with other cations. Preferred replacing cations include metal ions, hydrogen ions, hydrogen precursor (e.g., ammonium) ions and mixtures thereof. Particularly preferred replacing cations are those which tailor the catalytic activity for certain organic conversion reactions. These include hydrogen, rare earth metals and metals of Groups 2 to 15 of the Periodic Table of the Elements.

The molecular sieve described herein may be subjected to subsequent treatment to remove part or all of the structure directing agent (Q) used in its synthesis. This can be conveniently effected by thermal treatment in which the as-synthesized material can be heated at a temperature of at least 370° C. for at least 1 minute and not longer than 24 hours. The thermal treatment can be performed at a temperature up to 925° C. While sub-atmospheric and/or super-atmospheric pressures can be employed for the thermal treatment, atmospheric pressure may typically be desired for reasons of convenience. Additionally or alternatively, the organic structure directing agent can be removed by treatment with ozone (see, e.g., A. N. Parikh et al., *Micropor. Mesopor. Mater.* 2004, 76, 17-22). The organic-free product, especially in its metal, hydrogen and ammonium forms, is particularly useful in the catalysis of certain organic (e.g., hydrocarbon) conversion reactions. In the present disclosure, the organic-free molecular sieve in its hydrogen form is referred to as "active form" of the molecular sieve, with or without metal function present.

Characterization of the Molecular Sieve

In its as-synthesized and anhydrous form, molecular sieve SSZ-113 can have a chemical composition comprising the following molar relationship:

|  | Broad | Exemplary |
|---|---|---|
| (SiO$_2$ + GeO$_2$)/Al$_2$O$_3$ | 20 | 20 to 600 |
| Q/(SiO$_2$ + GeO$_2$) | >0 to 0.1 | >0 to 0.1 |
| F/(SiO$_2$ +GeO$_2$) | >0 to 0.1 | >0 to 0.1 | wherein compositional variable Q is as described herein above.

It should be noted that the as-synthesized form of the present molecular sieve may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

In its calcined form, molecular sieve SSZ-113 can have a chemical composition comprising the following molar relationship:

$$Al_2O_3:(n)(SiO_2+GeO_2)$$

wherein n is at least 20 (e.g., 20 to 600).

The as-synthesized and calcined forms of SSZ-113 have characteristic powder X-ray diffraction patterns, which in the as-synthesized form of the molecular sieve, includes at least the lines listed in Table 1 below and which, in the calcined form of the molecular sieve, includes at least the peaks listed in Table 2 below.

TABLE 1

Characteristic Peaks for As-Synthesized SSZ-113

| 2-Theta[a] | d-Spacing, nm | Relative Intensity[b] |
|---|---|---|
| 7.87 | 1.123 | W |
| 8.84 | 1.000 | S |
| 9.63 | 0.918 | M |
| 15.81 | 0.560 | VS |
| 16.85 | 0.526 | VS |
| 18.20 | 0.487 | M |
| 20.92 | 0.424 | S |
| 23.40 | 0.380 | VS |
| 23.78 | 0.374 | VS |
| 24.71 | 0.360 | W |
| 26.12 | 0.341 | S |
| 27.47 | 0.324 | W |

[a]±0.30 degrees
[b]The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong (>60 to ≤100).

TABLE 2

Characteristic Peaks for Calcined SSZ-113

| 2-Theta[a] | d-Spacing, nm | Relative Intensity[b] |
|---|---|---|
| 7.80 | 1.133 | W |
| 9.02 | 0.979 | VS |
| 9.78 | 0.904 | M |
| 15.69 | 0.564 | S |
| 16.72 | 0.530 | W |
| 18.28 | 0.485 | VS |
| 21.04 | 0.422 | W |
| 23.53 | 0.378 | M |
| 26.22 | 0.340 | VS |
| 27.36 | 0.326 | W |

[a]±0.30 degrees
[b]The powder XRD patterns provided are based on a relative intensity scale in which the strongest line in the X-ray pattern is assigned a value of 100: W = weak (>0 to ≤20); M = medium (>20 to ≤40); S = strong (>40 to ≤60); VS = very strong? (>60 to ≤100).

The powder X-ray diffraction patterns presented herein were collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the sample due to changes in lattice constants. In addition, disordered materials and/or sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

Sorption and Catalysis

Molecular sieve SSZ-113 can be used as a sorbent or as a catalyst to catalyze a wide variety of organic compound conversion processes including many of present commercial/industrial importance. Examples of chemical conversion processes which are effectively catalyzed by SSZ-113, by itself or in combination with one or more other catalytically active substances including other crystalline catalysts, include those requiring a catalyst with acid activity. Examples of organic conversion processes which may be catalyzed by SSZ-113 can include, for example, cracking, hydrocracking, disproportionation, alkylation, oligomerization, and isomerization.

As in the case of many catalysts, it may be desirable to incorporate SSZ-113 with another material resistant to the temperatures and other conditions employed in organic conversion processes. Such materials can include active and inactive materials and synthetic or naturally occurring zeolites as well as inorganic materials such as clays, silica and/or metal oxides such as alumina. The latter may be either naturally occurring, or in the form of gelatinous precipitates or gels, including mixtures of silica and metal oxides. Use of a material in conjunction with SSZ-113 (i.e., combined therewith or present during synthesis of the new material) which is active, can tend to change the conversion and/or selectivity of the catalyst in certain organic conversion processes. Inactive materials can suitably serve as diluents to control the amount of conversion in a given process so that products can be obtained in an economic and orderly manner without employing other means for controlling the rate of reaction. These materials may be incorporated into naturally occurring clays (e.g., bentonite and kaolin) to improve the crush strength of the catalyst under commercial operating conditions. These materials (i.e., clays, oxides, etc.) can function as binders for the catalyst. It can be desirable to provide a catalyst having good crush strength because in commercial use it can be desirable to prevent the catalyst from breaking down into powder-like materials (fines). These clay and/or oxide binders have been employed normally only for the purpose of improving the crush strength of the catalyst.

Naturally occurring clays which can be composited with SSZ-113 include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with SSZ-113 can additionally or alternatively include inorganic oxides, such as silica, zirconia, titania, magnesia, beryllia, alumina, and mixtures thereof.

Additionally or alternatively to the foregoing materials, SSZ-113 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of SSZ-113 and inorganic oxide matrix may vary widely, with the SSZ-113 content ranging from 1 to 90 wt. % (e.g., 2 to 80 wt. %) of the composite.

EXAMPLES

The following illustrative examples are intended to be non-limiting.

Example 1

Synthesis of SSZ-113

A Teflon liner was charged with 7.5 mmoles of a 1,3-bis (2,3-dimethyl-1H-imidazolium)propane dihydroxide solution (based on hydroxide content). Then, 0.178 g of germanium oxide was added followed by 0.813 g of CBV-780 Y-zeolite (Zeolyst International; $SiO_2/Al_2O_3$ molar ratio=80). The liner was then placed in a hood for a time sufficient to evaporate water in an amount such that the molar ratio of water to T-atoms (i.e., Si+Ge+Al) in the reaction mixture was about 5. Then, 7.5 m moles of a 48% HF solution was carefully added dropwise to the reaction mixture. The Teflon liner was capped and sealed in a Parr autoclave. The autoclave was affixed on a rotating spit (43 rpm) and heated in an oven at 160° C. for 6 days. The solid products were recovered from the reaction mixture by centrifugation, washed with deionized water and dried at 95° C.

Powder XRD of the as-synthesized product gave the pattern indicated in FIG. 1 and showed the product to be a pure form of a new molecular sieve phase, designated SSZ-113.

Figure 2B:
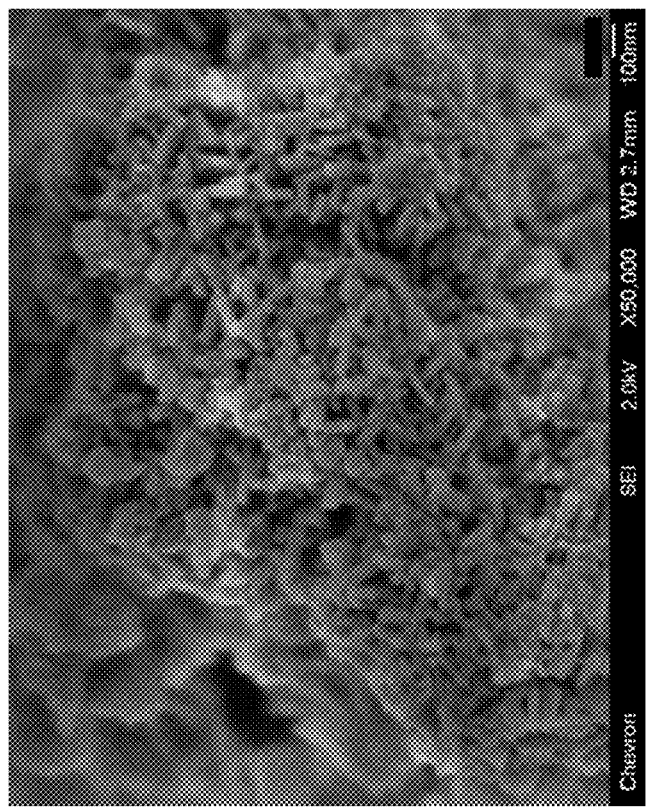
FIGS. 2(*a*) and 2(*b*) are Scanning Electron Micrograph (SEM) images of the as-synthesized molecular sieve of Example 1 at different magnifications.
Figure 2A:
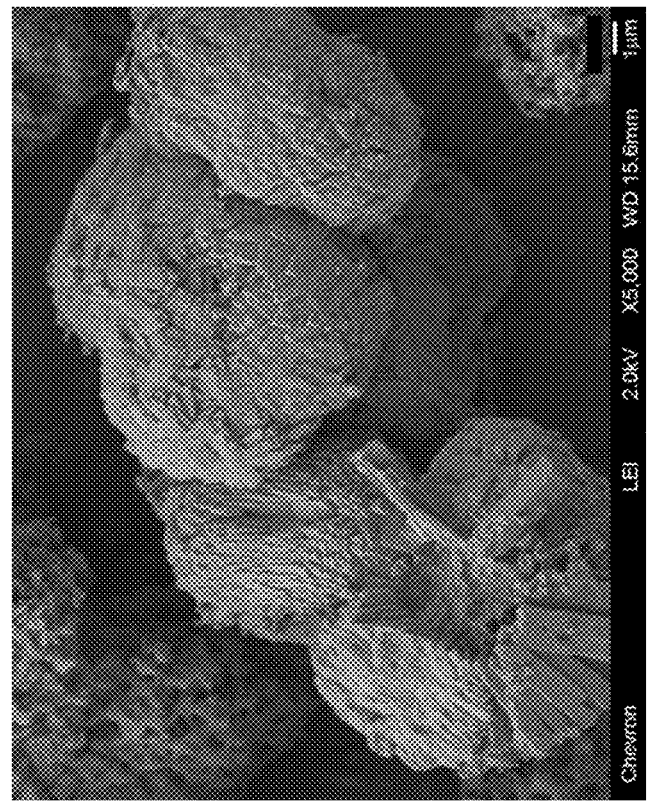

SEM images of the as-synthesized product are shown in FIGS. 2(*a*) and 2(*b*) at different magnifications, indicating a uniform field of crystals.

Example 2

Example 1 was repeated, except that 390HUA Y-zeolite (Tosoh USA, Inc.; $SiO_2/Al_2O_3$ molar ratio=500) was used instead of CBV-780 Y-zeolite.

Powder XRD confirmed the product to be pure SSZ-113 molecular sieve.

Example 3

Calcination of SSZ-113

The as-synthesized molecular sieve of Example 1 was calcined inside a muffle furnace under a flow of air heated to 550° C. at a rate of 1° C./minute and held at 550° C. for 5 hours, cooled and then analyzed by powder XRD.

Figure 3:
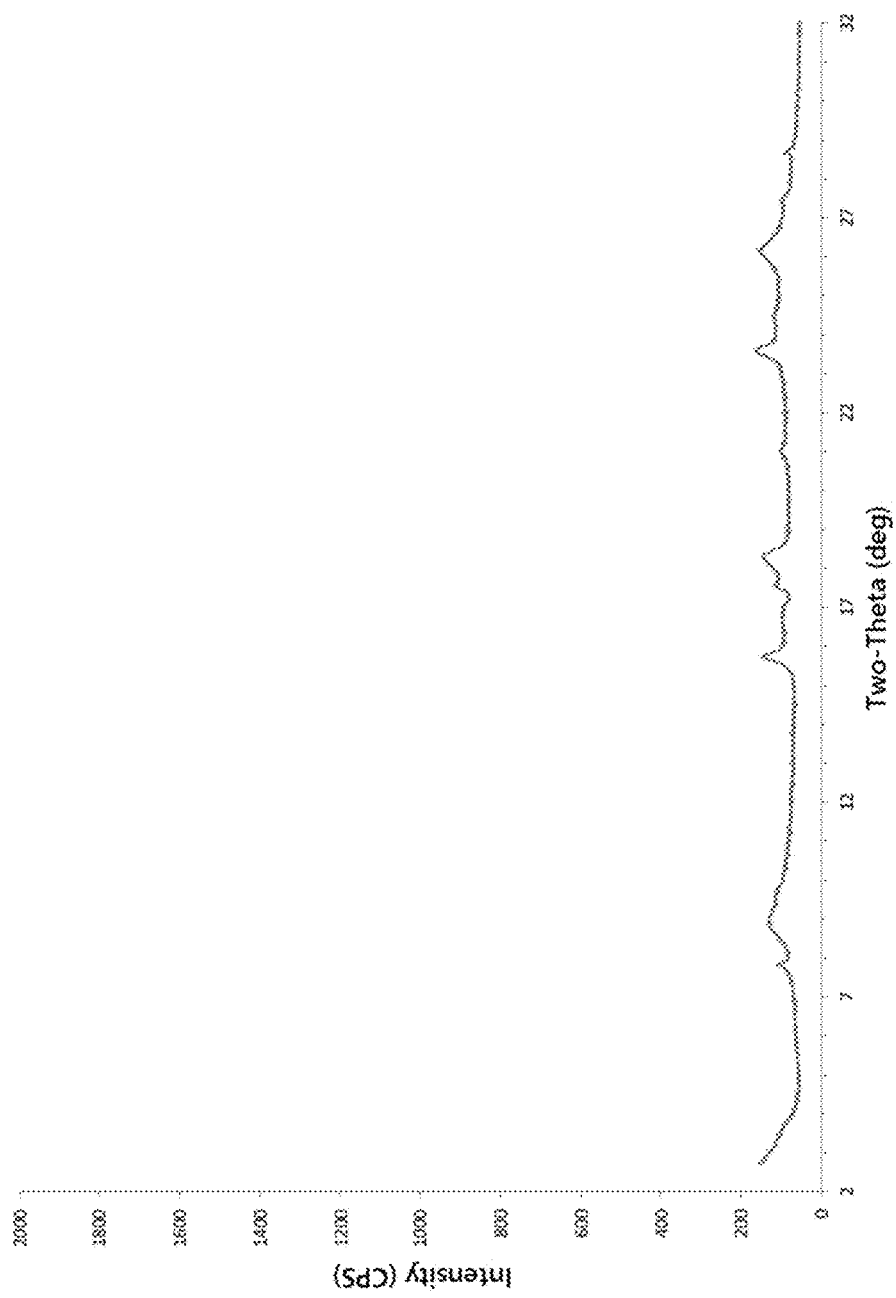
FIG. 3 shows the powder XRD pattern of the calcined molecular sieve of Example 4.

Powder XRD of the calcined product gave the pattern indicated in FIG. 3 and showed the material to be stable after calcination to remove the structure directing agent.

Example 4

Micropore Volume Analysis

The calcined molecular sieve material of Example 3 was treated with 10 mL (per g of molecular sieve) of a 1N ammonium nitrate solution at 95° C. for 2 hours. The mixture was cooled, the solvent decanted off and the same process repeated.

After drying, the product ($NH_4$—SSZ-113) was subjected to micropore volume analysis using $N_2$ an adsorbate and via the B.E.T. method. The molecular sieve had a micropore volume of 0.15 $cm^3/g$. The molecular sieve had a total pore volume of 0.25 $cm^3/g$.

Example 5

Constraint Index Determination

The $H^+$ form of SSZ-113 was pelletized at 3 kpsi, crushed and granulated to 20-40 mesh. A sample (0.6 g) of the granulated material was calcined in air at 550° C. for 4 hours and cooled in a desiccator to ensure dryness. Then, 0.5 g of the material was packed into a ½ inch stainless steel tube with alundum on both sides of the molecular sieve bed. A Lindburg furnace was used to heat the reactor tube. Helium was introduced into the reactor tube at 10 mL/minute and at atmospheric pressure. The reactor was heated to about 800° F., and a 50/50 feed of n-hexane and 3-methylpentane was introduced into the reactor at a rate of 8 µL/min. The feed was delivered by a Brownlee pump. Direct sampling into a GC began after 10 minutes of feed introduction. The Constraint Index (CI) value was calculated from the GC data using methods known in the art and determined to be 0.5. The total feed conversion was 6.0%.

The invention claimed is:

1. A molecular sieve having, in its calcined form, an X-ray diffraction pattern including the peaks listed in the following table:

| 2-Theta | d-Spacing, nm | Relative Intensity |
|---|---|---|
| 7.80 ± 0.30 | 1.133 | W |
| 9.02 ± 0.30 | 0.979 | VS |
| 9.78 ± 0.30 | 0.904 | M |
| 15.69 ± 0.30 | 0.564 | S |
| 16.72 ± 0.30 | 0.530 | W |
| 18.28 ± 0.30 | 0.485 | VS |
| 21.04 ± 0.30 | 0.422 | W |
| 23.53 ± 0.30 | 0.378 | M |
| 26.22 ± 0.30 | 0.340 | VS |
| 27.36 ± 0.30 | 0.326 | W. |

2. The molecular sieve of claim 1, and having a composition comprising the molar relationship:

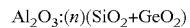

$Al_2O_3$:(*n*)($SiO_2$+$GeO_2$)

wherein n is at least 20.

3. The molecular sieve of claim 1, and having a composition comprising the molar relationship:

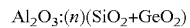

$Al_2O_3$:(*n*)($SiO_2$+$GeO_2$)

wherein n is in a range of 20 to 600.

4. A molecular sieve having, in its as-synthesized form, an X-ray diffraction pattern including the peaks listed in the following table:

| 2-Theta | d-Spacing, nm | Relative Intensity |
|---|---|---|
| 7.87 ± 0.30 | 1.123 | W |
| 8.84 ± 0.30 | 1.000 | S |
| 9.63 ± 0.30 | 0.918 | M |
| 15.81 ± 0.30 | 0.560 | VS |
| 16.85 ± 0.30 | 0.526 | VS |
| 18.20 ± 0.30 | 0.487 | M |
| 20.92 ± 0.30 | 0.424 | S |
| 23.40 ± 0.30 | 0.380 | VS |
| 23.78 ± 0.30 | 0.374 | VS |
| 24.71 ± 0.30 | 0.360 | W |
| 26.12 ± 0.30 | 0.341 | S |
| 27.47 ± 0.30 | 0.324 | W. |

5. The molecular sieve of claim 4, and having a composition comprising the molar relationship:

| | |
|---|---|
| $(SiO_2 + GeO_2)/Al_2O_3$ | ≥20 |
| $Q/(SiO_2 + GeO_2)$ | >0 to 0.1 |
| $F/(SiO_2 + GeO_2)$ | >0 to 0.1 | wherein Q comprises 1,3-bis(2,3-dimethyl-1H-imidazolium)propane dications.

6. The molecular sieve of claim 4, and having a composition comprising the molar relationship:

| | |
|---|---|
| $(SiO_2 + GeO_2)/Al_2O_3$ | 20 to 600 |
| $Q/(SiO_2 + GeO_2)$ | >0 to 0.1 |
| $F/(SiO_2 + GeO_2)$ | >0 to 0.1 | wherein Q comprises 1,3-bis(2,3-dimethyl-1H-imidazolium)propane dications.

7. A method of synthesizing the molecular sieve of claim 4, the method comprising:

(a) providing a reaction mixture comprising:
  (1) a source of germanium oxide;
  (2) a source of silicon oxide;
  (3) a source of aluminum oxide;
  (4) a source of 1,3-bis(2,3-dimethyl-1H-imidazolium) propane dications (Q);
  (5) a source of fluoride ions; and
  (6) water; and
(b) subjecting the reaction mixture to crystallization conditions sufficient to form crystals of the molecular sieve.

8. The method of claim 7, wherein the reaction mixture has a composition, in terms of molar ratios, as follows:

| | |
|---|---|
| $(SiO_2 + GeO_2)/Al_2O_3$ | ≥20 |
| $Q/(SiO_2 + GeO_2)$ | 0.05 to 0.50 |
| $F/(SiO_2 + GeO_2)$ | 0.10 to 1.00 |
| $H_2O/(SiO_2 + GeO_2 + Al_2O_3)$ | 3 to 8. |

9. The method of claim 7, wherein the reaction mixture has a composition, in terms of molar ratios, as follows:

| | |
|---|---|
| $(SiO_2 + GeO_2)/Al_2O_3$ | 20 to 600 |
| $Q/(SiO_2 + GeO_2)$ | 0.05 to 0.50 |
| $F/(SiO_2 + GeO_2)$ | 0.15 to 0.50 |
| $H_2O/(SiO_2 + GeO_2 + Al_2O_3)$ | 4 to 6. |

10. The method of claim 7, wherein the source of silicon oxide and aluminum oxide comprises zeolite Y.

11. The method of claim 7, wherein the crystallization conditions include a temperature of from 125° C. to 200° C.

12. A process for converting a feedstock comprising an organic compound to a conversion product which comprises contacting the feedstock at organic compound conversion conditions with a catalyst comprising an active form of the molecular sieve of claim 1.

* * * * *